United States Patent
Mochida

(10) Patent No.: US 10,814,554 B2
(45) Date of Patent: Oct. 27, 2020

(54) CONTROL DEVICE FOR LASER MACHINING APPARATUS, AND LASER MACHINING APPARATUS

(71) Applicant: FANUC CORPORATION, Yamanashi (JP)

(72) Inventor: Takeshi Mochida, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/450,470

(22) Filed: Jun. 24, 2019

(65) Prior Publication Data

US 2020/0039147 A1  Feb. 6, 2020

(30) Foreign Application Priority Data

Aug. 3, 2018  (JP) .................................. 2018-146574

(51) Int. Cl.
  *B23K 26/00*  (2014.01)
  *B23K 26/082*  (2014.01)
  (Continued)

(52) U.S. Cl.
  CPC ........ *B29C 64/268* (2017.08); *B23K 26/0093* (2013.01); *B23K 26/082* (2015.10); *B29C 64/277* (2017.08); *B33Y 30/00* (2014.12)

(58) Field of Classification Search
  CPC ........... B22F 2003/1057; B22F 3/1055; B23K 26/0093; B23K 26/0608; B23K 26/082;
  (Continued)

(56) References Cited

U.S. PATENT DOCUMENTS 9,925,715 B2 *  3/2018  Cheverton ............. B23K 26/34
10,583,529 B2 *  3/2020  Gray .................... B22F 3/1055
(Continued)

FOREIGN PATENT DOCUMENTS

JP  2004-249364 A  9/2004
JP  2010-264494 A  11/2010
(Continued)

OTHER PUBLICATIONS

An Office Action; "Notification of Reasons for Refusal," mailed by the Japanese Patent Office dated Jun. 9, 2020, which corresponds to Japanese Patent Application No. 2018-146574 and is related to U.S. Appl. No. 16/450,470 with English language translation.

*Primary Examiner* — Abdelmoniem I Elamin
(74) *Attorney, Agent, or Firm* — Studebaker & Brackett PC

(57) ABSTRACT

A control device for a laser machining apparatus includes: a plurality of lasers, a plurality of scanners which respectively scans the laser beams outputted from the plurality of lasers, a scanner control unit which synchronously controls the plurality of scanners, and a laser control unit which synchronously controls the plurality of lasers, in which the scanner control unit performs tracking control to precede or delay operation of at least one scanner among the plurality of scanners relative to operation of another scanner among the plurality of scanners; and the laser control unit performs tracking control to precede or delay laser output of at least one laser among the plurality of lasers corresponding to the at least one scanner, relative to the laser output of another laser among the plurality of lasers corresponding to the other scanner.

5 Claims, 5 Drawing Sheets

(51) Int. Cl.
*B29C 64/268* (2017.01)
*B29C 64/277* (2017.01)
*B33Y 30/00* (2015.01)

(58) Field of Classification Search
CPC ... B23K 26/342; B29C 64/268; B29C 64/277; B33Y 30/00; B33Y 50/02
See application file for complete search history.

(56) References Cited

U.S. PATENT DOCUMENTS

| 2015/0375456 | A1* | 12/2015 | Cheverton | ........... B23K 26/032 |
| | | | | 264/406 |
| 2017/0173736 | A1* | 6/2017 | Gray | ..................... B29C 64/153 |
| 2017/0173737 | A1* | 6/2017 | Gray | ..................... B33Y 50/02 |
| 2017/0173883 | A1* | 6/2017 | Gray | ..................... B33Y 30/00 |
| 2018/0178449 | A1* | 6/2018 | Cheverton | ........... B23K 26/342 |

FOREIGN PATENT DOCUMENTS

| JP | 2013-091074 A | 5/2013 |
| JP | 2015-093284 A | 5/2015 |
| JP | 5826430 B1 | 12/2015 |
| JP | 2017-030254 A | 2/2017 |
| JP | 6234596 B1 | 11/2017 |

* cited by examiner

CONTROL DEVICE FOR LASER MACHINING APPARATUS, AND LASER MACHINING APPARATUS

This application is based on and claims the benefit of priority from Japanese Patent Application. No. 2018-146574, filed on 3 Aug. 2018, the content of which is incorporated herein by reference.

BACKGROUND OF THE INVENTION

Field of the Invention

The present invention relates to a control device for a laser machining apparatus which includes a plurality of lasers, and a plurality of scanners which respectively scan laser beams emitted from the plurality of lasers; and a laser machining apparatus.

Related Art

Among the laser machining apparatuses, there are apparatuses which perform laser machining by scanning a laser beam using a scanner. Such a laser machining apparatus is used in additive manufacturing (Additive Manufacturing: AM) of a powder bed fusion (Part Bed Fusion: PBF) method, for example. Molding in the powder bed fusion method is molding which laminates a powder material to form a powder bed, and melts the powder material of the powder bed using a laser beam, and allows to solidify and fuse. The additive manufacturing performs molding of a laminate form by repeating such molding a plurality of times. Patent Documents 1 and 2 disclose laser machining apparatuses which perform the additive manufacturing of such powder bed fusion method.

The laser machining apparatus disclosed in Patent Document 1 uses a plurality of galvanoscanners to machine separate regions by the respective galvanoscanners. It is thereby possible to shorten the machining time. The laser machining apparatus disclosed in Patent Document 2 uses a plurality of galvanoscanners, and synchronizes the plurality of galvanoscanners to perform one machining operation. For example, it preheats by increasing the radiation range of one laser beam, and machines by decreasing the irradiation range of other laser beams. It is thereby possible to raise the molding efficiency.

Patent Document 1: Japanese Patent No. 6234596
Patent Document 2: Japanese Patent No. 5826430

SUMMARY OF THE INVENTION

With the synchronous control of a laser machining apparatus described in Patent Document 2, it is considered that the focal point positions or center positions of the laser beams outputted from the plurality of scanners are the same. However, as the synchronous control of a laser machining apparatus, there is tracking control which causes the focal point positions or center positions of laser beams outputted from a plurality of scanners to differ, in which the laser beam outputted from at least one scanner irradiates a powder bed before a laser beam outputted from another scanner, and the focal point position or center position of the laser beam outputted from the other scanner follows the focal point position or center position of the laser beam outputted from the at least one scanner on the same path.

The present invention has an object of providing a laser machining apparatus and a control device for a laser machining apparatus which can perform tracking control on a plurality of lasers and a plurality of scanners.

(1) A control device (for example, the control device 30 for a laser machining apparatus described later) for a laser machining apparatus according to the present invention, the laser machining apparatus having a plurality of lasers (for example, the first laser 11 and second laser 12 described later), and a plurality of scanners (for example, the first scanner 21 and second scanner 22 described later) which respectively scan laser beams outputted from the plurality of lasers, includes: a scanner control unit (for example, the scanner control unit 100 described later) which synchronously controls the plurality of scanners; and a laser control unit (for example, the laser control unit 200 described later) which synchronously controls the plurality of lasers, in which the scanner control unit performs tracking control to precede or delay operation of at least one scanner among the plurality of scanners relative to operation of another scanner among the plurality of scanners, and the laser control unit (200) performs tracking control to precede or delay laser output of at least one laser among the plurality of lasers corresponding to the at least one scanner, relative to laser output of another laser among the plurality of lasers corresponding to the other scanner.

(2) In the control device for a laser machining apparatus described in (1), the scanner control unit may include a buffer (for example, the first buffer 151 and second buffer 152 described later) which temporarily saves a control command of the scanner to delay operation among the plurality of scanners, and the laser control unit may include a buffer (for example, the first buffer 231 and second buffer 232 described later) which temporarily saves a control command of the laser to delay laser output among the plurality of lasers.

(3) In the control device for a laser machining apparatus described in (1) or (2), the scanner control unit may control the plurality of scanners so that: a laser beam outputted from the at least one scanner irradiates a machining target prior to a laser beam outputted from the other scanner, and a focal point or center of the laser beam outputted from the other scanner follows a focal point or center of the laser beam outputted from the at least one scanner on the same path.

(4) In the control device for a laser machining apparatus described in (3), the scanner control unit may control the plurality of scanners so that a beam diameter on the machining target of the laser beam outputted from the at least one scanner becomes larger than a beam diameter on the machining target of the laser beam outputted from the other scanner.

(5) A laser machining apparatus (for example, the laser machining apparatus 1 described later) according to the present invention includes: a plurality of lasers (for example, the first laser 11 and second laser 12 described later); a plurality of scanner (for example, the first scanner 21 and second scanner 22 described later) which respectively scan laser beams outputted from the plurality of lasers; and a control device (for example, the control device 30 for a laser machining apparatus described later) for the laser machining apparatus as described in any one of (1) to (4) which controls the plurality of scanners.

According to the present invention, it is possible to provide a laser machining apparatus and a control device for a laser machining apparatus which can perform tracking control on a plurality of lasers and a plurality of scanners.

DETAILED DESCRIPTION OF THE INVENTION

Hereinafter, an example of an embodiment of the present invention will be explained by referencing the attached drawings. It should be noted that the same reference symbols shall be attached to identical or corresponding portions is the respective drawings.

First Embodiment

<Laser Machining Apparatus>

Figure 1:
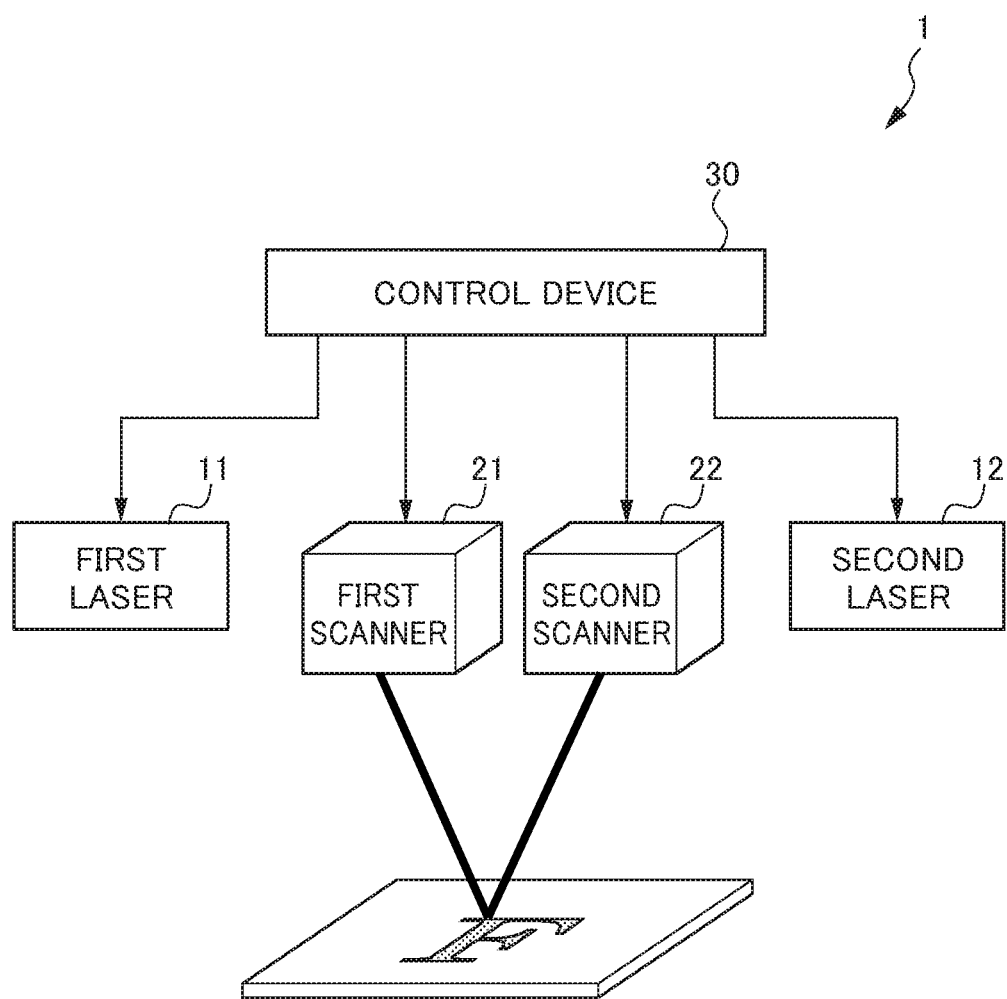
FIG. 1 is a schematic drawing showing a laser machining apparatus according to the present embodiment.

FIG. 1 is a schematic drawing showing a laser machining apparatus according to the present embodiment. The laser machining apparatus 1 shown in FIG. 1 is used in the additive manufacturing of the powder bed fusion method, for example. The laser machining apparatus 1 irradiates a laser beam onto the powder bed to melt the powder material of the powder bed, and then allows to solidify and fuse. The laser machining apparatus 1 performs molding of laminate form by repeating such molding a plurality of times. It should be noted that FIG. 1 omits the configuration which laminates powder material in order to form the powder bed.

The laser machining apparatus 1 includes a first laser 11 and a first scanner 21 of a first system, and a second laser 12 and a second scanner 22 of a second system.

The laser 11 generates a laser beam, and irradiates the generated laser beam onto a first scanner 21. The first scanner 21 receives the laser beam outputted from the first laser 11, and scans the laser beam onto the powder bed.

Similarly, the second laser 12 generates a laser beam, and outputs the generated laser beam onto the second scanner 22. The second scanner 22 receives the laser beam outputted from the second laser 12, and scans the laser beam onto the powder bed.

The control device 30 controls the first laser 11 and first scanner 21 of the first system, and the second laser 12 and second scanner 22 of the second system. In the present embodiment, the control device 30 synchronously controls the first scanner 21 of the first system and the second scanner 22 of the second system, so that the laser beam of the first system and the laser beam of the second system irradiate the same location on the powder bed (machining target), and scan the same path.

<Scanner Device>

Figure 2:
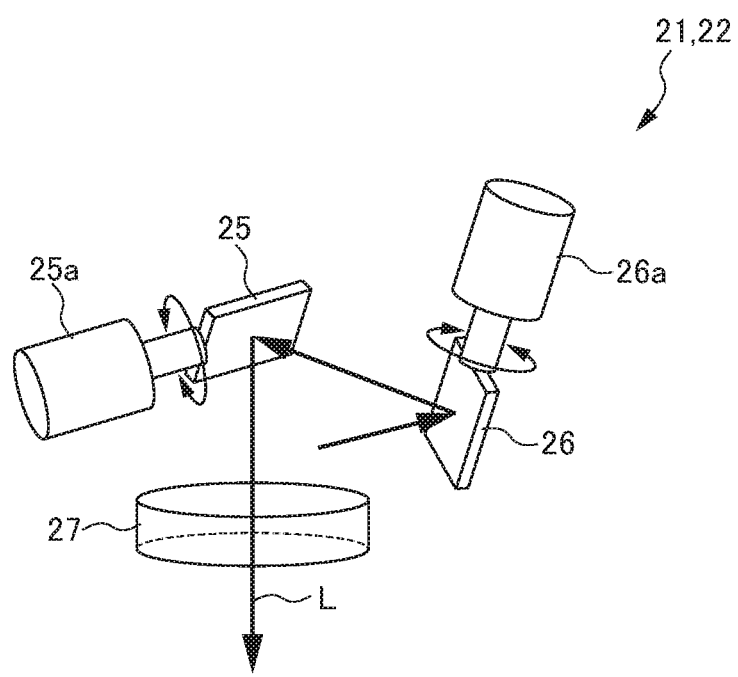
FIG. 2 is a schematic drawing showing a scanner of the laser machining apparatus according to the present embodiment.

FIG. 2 is a schematic drawing showing the first scanner 21 and second scanner 22. Hereinafter, although the first scanner 21 will be explained, the same also applies to the second scanner 22. The first scanner 21 is a galvanoscanner including the two mirrors 25, 26 which reflect the laser beam L outputted from the first laser 11; and servomotors 25a, 26a which rotationally drive the mirrors 25, 26, respectively; and a converging lens 27 which converges the laser beam L reflected by the mirrors 25, 26.

The mirrors 25, 26 are configured to be rotatable around two axes of rotation which are orthogonal to each other, for example. The servomotor 25a, 26a rotationally drive based on drive data from the control device 30, and cause the mirrors 25, 26 to rotate independently around the axes of rotation.

The first scanner 21 causes the outputted laser beam L to scan the X and Y directions, by changing the rotation angles of each of the mirrors 25, 26 by appropriately controlling the rotational driving of the servomotors 25a, 26a based on the drive data from the control device 30. In addition, the first scanner 21 changes the focal point of the outputted laser beam L to the Z direction, by controlling the position of the lens 27, for example, i.e. lens servomotor (not shown), based on the drive data from the control device 30.

<Control Device>

Figure 3:
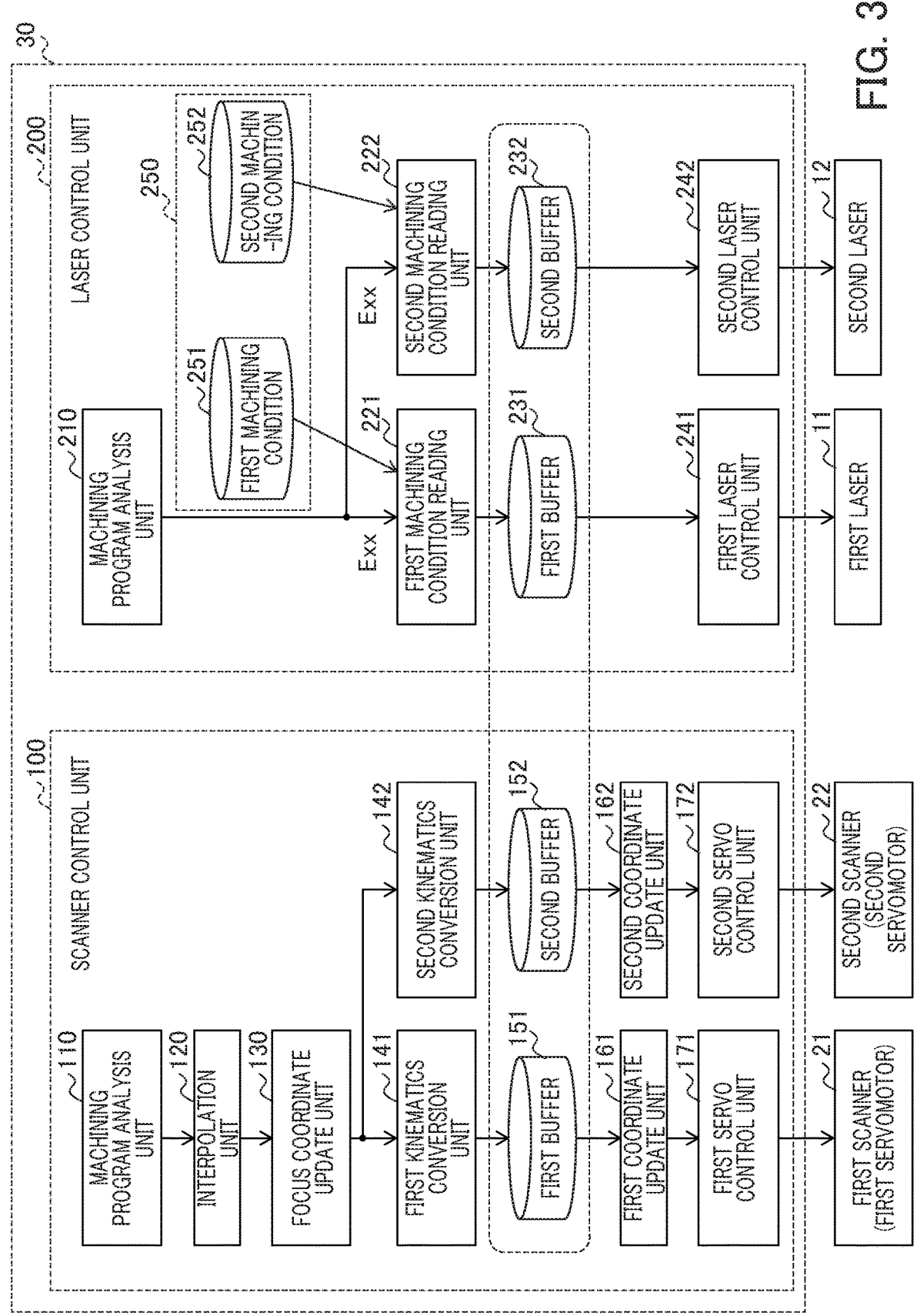
FIG. 3 is a schematic drawing showing a control device for the laser machining apparatus according to the present embodiment.

FIG. 3 is a schematic diagram showing the control device for the laser machining apparatus according to the present embodiment. The control device 30 shown in FIG. 3 includes a scanner control unit 100 which controls the first scanner 21 and second scanner 22 of two systems, and a laser control unit 200 which controls the first laser 11 and second laser 12 of two systems.

The scanner control unit 100 is configured by the first system controlling the first scanner 21 of the first system, and the second system controlling the second scanner 22 of the second system. The first system of the scanner control unit 100 includes a machining program analysis unit 110, interpolation unit 120, focal-point coordinate update unit 130, first kinematics conversion unit 141, first buffer 151, first coordinate update unit 161, and first servo control unit 171.

On the other hand, the second system of the scanner control unit 100 includes a second kinematics conversion unit 142, second buffer 152, second coordinate update unit 162 and second servo control unit 172. In other words, the second system of the scanner control unit 100 does not include the machining program analysis unit, interpolation unit and focal-point coordinate update unit.

The machining program analysis unit 110 analyzes the machining program, and generates movement command data which indicates the movement amount of the focal point (or center) of the laser beam. The interpolation unit 120 generates interpolation data indicating the movement amount for every predetermined period of the focus (or center) of the laser beam interpolated for every predetermined period, based on the movement command data.

The focal-point coordinate update unit 130 updates the coordinates (XYZ coordinates, machine coordinates) for every predetermined period of the focus (or center) of the laser beam, based on the interpolation data, i.e. the movement amount for every predetermined period.

The first kinematics conversion unit 141 performs kinematics conversion based on the coordinates (XYZ coordinates, machine coordinates) for every predetermined period of the focus (or center) of the laser beam and the positional information of the first scanner 21 which is the control target, and generates the angles of the mirrors 25, 26 (i.e. rotational positions of the servomotors 25a, 26a) and the position of the converging lens 27 (i.e. rotational position of the servomotor for the converging lens) of the first scanner 21. The positional information of the first scanner 21 is information indicating the installation position of the first scanner 21, for example. For example, with the laser machining apparatus used in the additive manufacturing of the powder bed fusion method, since the first scanner 21 is installed to be fixed, the positional information is fixed information.

Similarly, the second kinematics conversion unit 142 performs kinematics conversion based on the coordinates (XYZ coordinates, machine coordinates) for every predetermined period of the focal point (or center) of the laser beam of the first system, and the positional information of the second scanner 22 which is the control target, and generates the angles of the mirrors 25, 26 (i.e. rotational position of the servomotors 25a, 26a) and the position of the converging lens 27 (i.e. rotational position of the servomotor for the converging lens) of the second scanner 22. The positional information of the second scanner 22 is information indicating the installation position of the second scanner 22, for example. For example, with the laser machining apparatus used in the additive manufacturing of the powder bed fusion method, since the second scanner 22 is installed to be fixed, the positional information is fixed information.

The first buffer 151 temporarily saves the angles of the mirrors 25, 26 (i.e. rotational position of the servomotor 25a, 26a) and the position of the converging lens (i.e. rotational position of the servomotor for the converging lens) of the first scanner 21 converted by the first kinematics conversion unit 141.

Similarly, the second buffer 152 temporarily saves the angles of the mirrors 25, 26 (i.e. rotational position of the servomotor 25a, 26a), and the position of the converging lens (i.e. rotational position of the servomotor for the converging lens) of the second scanner 22 converted by the second kinematics conversion unit 142.

As the first and second buffers 151, 152, for example, a FIFO buffer can be exemplified. The first and second buffers 151, 152 function as timing adjustment units which adjust the control timing of each of the first and second scanners 21, 22 which are control targets, so that the laser beam outputted from the two systems of scanners 21, 22 irradiate the same location on the powder bed (machining target), and scan the same path.

The first coordinate update unit 161 updates the angles of the mirrors 25, 26 (i.e. rotational positions of the servomotors 25a, 26a) and the position of the converging lens 27 (i.e. rotational position of the servomotor for the lens) of the first scanner 21 which were converted by the first kinematics conversion unit 141, and temporarily saved in the first buffer 151.

Similarly, the second coordinate update unit 162 updates the angles of the mirrors 25, 26 (i.e. rotational positions of servomotors 25a, 26a), and the position of the converging lens 27 (rotational position of the servomotor for the lens) of the second scanner 22 which are converted by the second kinematics conversion unit 142, and temporarily saved in the second buffer 152.

The first servo control unit 171 performs servo control based on the angles of the mirrors 25, 26 (i.e. rotational positions of the servomotors 25a, 26a) and the position of the converging lens 27 (i.e. rotational position of the servomotor for the lens) of the first scanner 21 which were updated, and rotationally drives the servomotors 25a, 26a of the first scanner 21 and the servomotor for the lens. The first servo control unit 171 thereby controls the angles of the mirrors 25, 26 and the position of the converging lens 27 of the first scanner 21 which is the control target.

Similarly, the second servo control unit 172 performs servo control based on the angles of the mirrors 25, 26 (i.e. rotational positions of the servomotors 25a, 26a) and the position of the converging lens 27 (i.e. rotational position of the servomotor for the lens) of the second scanner 22 which were updated, and rotationally drives the servomotors 25a, 26a and the servomotor for the lens of the second scanner 22. The second servo control unit 172 thereby controls the angles of the mirror 25, 26 and the position of the converging lens 27 of the second scanner 22 which is the control target.

According to such a configuration, the scanner control unit 100 controls the angles of the mirrors 25, 26 (i.e. rotational positions of the servomotors 25a, 26a) and the position of the converging lens 27 (i.e. rotational position of the servomotor for the lens) of each of the first scanner 21 and second scanner 22, so that the focal point of the laser beam outputted from the first scanner 21 of the first system and the focal point of the laser beam outputted from the second scanner 22 of the second system are located at the same location of the part bed, and the focal points of these laser beams scan the same path. The scanner control unit 100 thereby performs synchronous control of the scanners 21, 22 of two systems, so that the laser beams of two systems irradiate the same locations on the powder bed, and scan the same path.

Figure 5A:
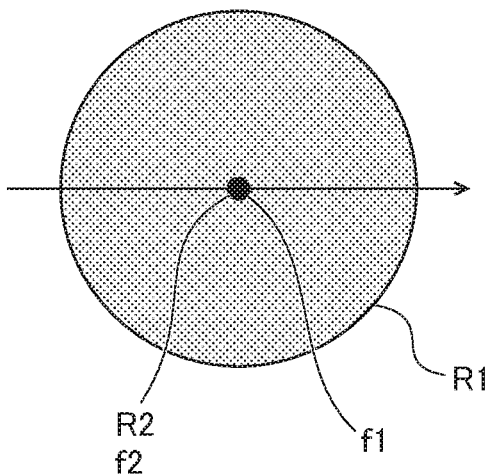
FIG. 5A is a view showing an example of the relationship of a plurality of laser beams according to the laser machining apparatus according to a modified example of the first embodiment.

At this time, the scanner control unit 100 may control the position of the converging lens 27 of the first scanner 21, so that the focal point f1 of the laser beam outputted from the first scanner 21 of the first system is shifted from the powder bed. As shown in FIG. 5A, the scanner control unit 100 can thereby make the radiation range R1 of the powder bed of the laser beam (focal point f1) outputted from the first scanner 21 of the first system to be larger than the radiation range R2 of the powder bed of the laser beam (focal point f2) outputted from the second scanner 22 of the second system. Also in this case, the scanner control unit 100 can perform synchronous control of the scanners 21, 22 of two systems, so that the laser beams of two systems irradiate substantially the same location on the powder bed, and scan the same path (on the arrows).

The laser control unit 200 is configured by the first system controlling the first laser 11 of the first system and the second system controlling the second laser 12 of the second system. The first system of the laser control unit 200 includes a machining program analysis unit 210, first machining condition reading unit 221, first buffer 231, and first laser control unit 241.

On the other hand, the second system of the laser control unit 200 includes a second machining condition reading unit 222, second buffer 232, and second laser control unit 242. In other words, the second system of the laser control unit 200 does not include a machining program analysis unit. In addition, the laser control unit 200 includes a storage unit 250.

The machining program analysis unit 210 analyzes the machining program, and generates a machining condition command Exx for setting the machining conditions of the first laser 11.

The storage unit 250 stores a machining condition table in which a plurality of machining conditions of the first laser 11 and a plurality of machining condition commands are associated with each other. Each machining condition, for example, includes a machining speed, laser output, laser frequency, laser duty and assist gas. The storage unit 250 is rewritable memory such as EEPROM, for example.

The first machining condition reading unit 221 references the machining condition table stored in the storage unit 250, reads a first machining condition 251 corresponding to the machining condition command Exx of the first laser 11 analyzed by the machining program analysis unit 210, and sets the first machining condition 251 that was read in the first laser 11, which is the control target via the first buffer 231.

Similarly, the second machining condition reading unit 222 references the machining condition table stored in the storage unit 250, reads the machining condition of the second laser 12 based on the machining condition command Exx of the first laser 11 analyzed by the machining program analysis unit 210, and sets the read machining condition in the second laser 12 which is the control target via the second buffer 232. The second machining condition reading unit 222 may read out the first machining condition 251 corresponding to the machining condition command Exx, and may read a second machining condition 252 which differs from the first machining condition 251 corresponding to the machining condition command Exx.

The first buffer 231 temporarily saves the first machining condition 251 read by the first machining condition reading unit 221. Similarly, the second buffer 232 temporarily saves the first machining condition 251 or second machining condition 252 read by the first machining condition reading unit 221.

As the first and second buffers 231, 232, for example, FIFO buffers can be exemplified. The first and second buffers 231, 232 function as timing adjustment units which adjust the control timing of each of the laser outputs of the lasers 11, 12 of two systems.

The first laser control unit 241 performs laser output control of the first laser 11 based on the first machining condition 251. Similarly, the second laser control unit 242 performs laser output control of the second laser 12, based on the first machining condition 251 or second machining condition 252.

The control device 30 (excluding the storage unit 250), for example, is configured by an arithmetic processor such as DSP (Digital Signal Processor) and FPGA (Field-Programmable Gate Array). The various functions of the control device 30 (excluding the storage unit 250), for example, are realized by executing predetermined software (programs) stored in the storage unit. The various functions of the control device 30 (excluding the storage unit 250) may be realized by cooperation between hardware and software, or may be realized by only hardware (electronic circuits).

However, as disclosed in the aforementioned Patent Documents 1 and 2, in order to control the scanners of two systems, it has been considered to prepare two machining programs, and then individually analyze and execute the two machining programs. In this case, it is assumed that complex control becomes necessary in order to synchronously control scanners of two systems so that the laser beams of two systems irradiate the same location on the powder bed, and scan the same path.

Concerning this point, according to the control device 30 of the laser machining apparatus of the present embodiment, by simply preparing, analyzing and executing one machining program in order to control the scanners 21, 22 of two systems, it is possible to synchronously control the scanners 21, 22 of two systems easily, so that the laser beams of the two systems irradiate on the same location of the powder bed, and scan the same path.

In addition, as disclosed in the aforementioned Patent Documents 1 and 2, in order to control the lasers of two systems, it has been considered to prepare two machining programs, and individually analyze and execute the two machining programs. In this case, in order to synchronously control the lasers of two systems so that the laser beams of two systems irradiate the same location on the powder bed and scan the same path, it is assumed that complex control is necessary.

Concerning this point, according to the control device 30 of the laser machining apparatus of the present embodiment, it is possible to synchronously control the lasers 11, 12 of two systems easily, so that the laser beams of two systems irradiate the same location on the powder bed, and scan the same path, by simply preparing, analyzing and executing one machining program in order to control the lasers 11, 12 of two systems.

In addition, according to the control device 30 for the laser machining apparatus of the present embodiment, even when performing synchronous control of the scanners 21, 22 of two systems and the lasers 11, 12 of two systems by way of one machining program, it is possible to set different laser machining conditions in the lasers 11, 12 of two systems.

Modified Example

In the example of FIG. 3, the scanner control unit 100 performs synchronous control of the scanners 21, 22 of two systems by generating coordinates (XYZ coordinates, machine coordinates) for every predetermined period of the focal point (or center) of the laser beam by the focal-point coordinate update unit 130 of the first system, and controlling the scanners 21, 22 of two systems based on the coordinates for every period (XYZ coordinates, machine coordinates) of focus (or center) of the laser beam generated by this focal-point coordinate update unit 13 of the first system. However, the present invention is not limited thereto.

Figure 4:
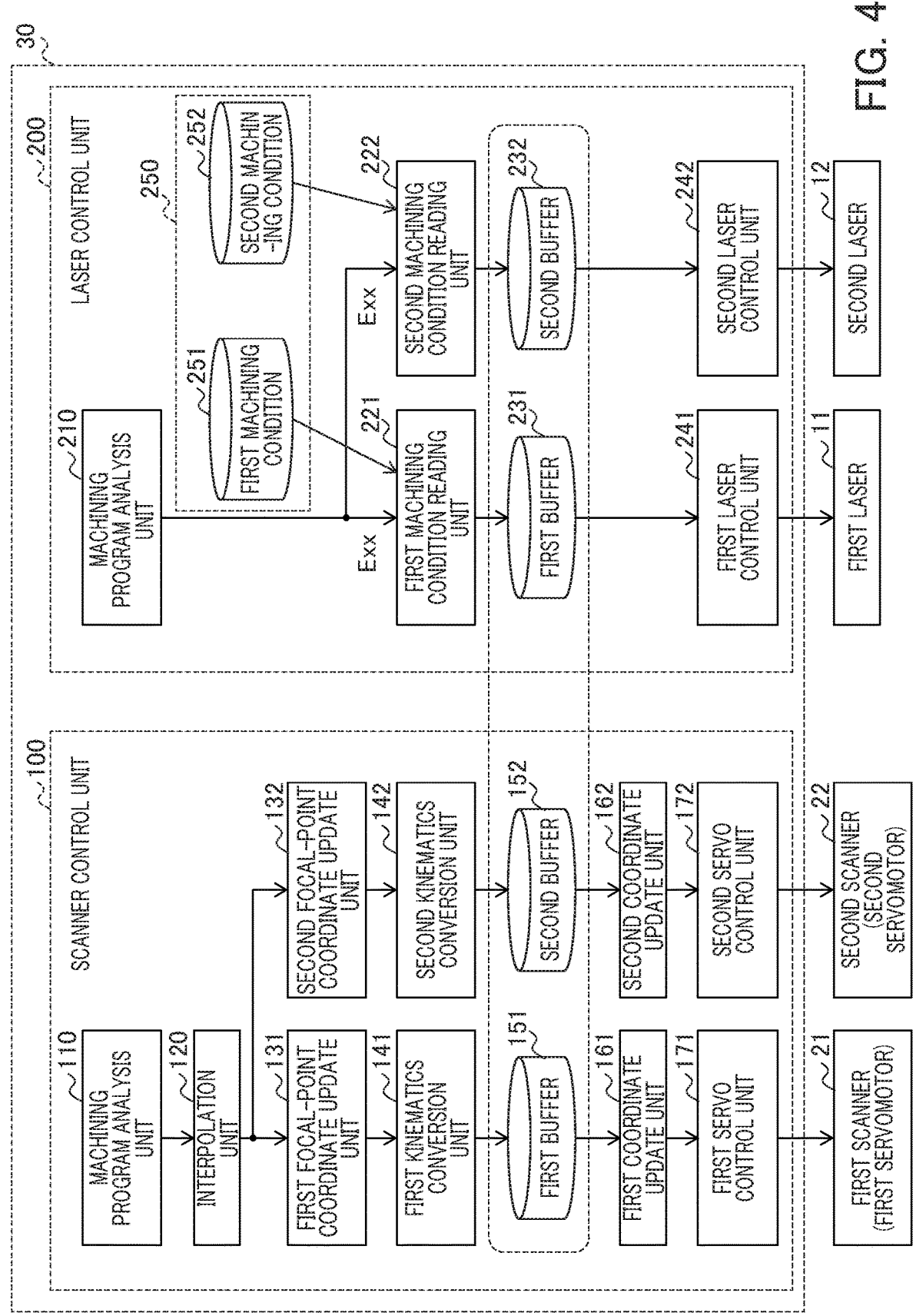
FIG. 4 is a schematic drawing showing the control device for a laser machining apparatus according to a modified example of the present embodiment.

For example, as shown in FIG. 4, the scanner control unit 100 may perform synchronous control of the scanners 21, 22 of two systems, by controlling the scanners 21, 22 of two systems based on the movement amount (interpolation data) (information indicating the movement amount of the focal point or center of the laser beam) for every predetermined period of the focal point (or center) of the laser beam generated by the interpolation unit 120 of the first system.

In this case, the first system and second system of the scanner control unit 100 may respectively include the first focal-point coordinate update unit 131 and second focal-point coordinate update unit 132 which update the coordinates (XYZ coordinates, machine coordinates) for every predetermined period of the focal point (or center) of the laser beam, based on the interpolation data, i.e. movement amount for every predetermined period.

In this case, the first system of the scanner control unit 100 comes to perform kinematics conversion based on the movement amount for every predetermined period of the focal point (or center) of the laser beam (interpolation data), and positional information of the first scanner 21 which is the control target, and controls the first scanner 21 which is the control target. In addition, the second system of the scanner control unit 100 comes to perform kinematics conversion based on the movement amount for every predetermined period of the focal point (or center) of the user beam (interpolation data), and positional information of the second scanner 22 which is the control target, and controls the second scanner 22 which is the control target.

Modified Example

The examples of FIG. 3 and FIG. 4 show an example of two systems of the control device 30 being configured by one numerical control device and servo control device; however, the two systems of the control device 30 may be configured by a different numerical control device and servo control device. In this case, the coordinates (XYZ coordinates, machine coordinates) for every predetermined period of the focal point (or center) of the laser beam acquired from the first system by the second system, or the movement amount (interpolation data) for every predetermined period of the focal point (or center) of the laser beam acquired from the first system by the second system is delayed compared to that of the first system. In this case, adjustment of the control timing by the first buffer 151 and second buffer 152 effectively functions.

In the examples of FIG. 3 and FIG. 4, the first and second buffers 151, 152 are respectively arranged between the first and second kinematics conversion units 141, 142 and the second conversion update units 161, 162; however, the arrangement positions of the first and second buffers 151, 152 are not limited thereto. For example, the first and second buffers 151, 152 may be respectively arranged between the first and second focal-point coordinate update units 131, 132 and the first and second kinematics conversion units 141, 142, or may be respectively arranged before the first and second coordinate conversion update units 131, 132.

When the first and second buffers 151, 152 are arranged before the first and second coordinate update units 161, 162 in this way, the first and second coordinate update units 161, 162 generate the angles of the mirrors 25, 26 (i.e. rotational position of the servomotors 25a, 26a) and the position of the lens 27 (i.e. rotational position of the servomotor of the lens) of the first scanner 21 after timing adjustment. In this case, the position command values generated by the first and second coordinate update units 161, 162 matches the angles of the mirrors 25, 26 (i.e. rotational position of the servomotor 25a, 26a) and the position of the lens 27 (i.e. rotational position of the servomotor for lens) of the first scanner 21 actually controlled.

In addition, the first and second buffers 151, 152 may be respectively arranged between the first and second coordinate update units 161, 162 and the first and second servo control units 171, 172. When the first and second buffers 151, 152 are arranged after the first and second coordinate update units 161, 162 in this way, the angles of the mirrors 25, 26 (i.e. rotational position of the servomotors 25a, 26a) and the position of the lens 27 (i.e. rotational position of the servomotor for the lens) of the first scanner 21 actually controlled come to be delayed relative to the position command value generated by the first and second coordinate update units 161, 162.

In addition, at least one of the first buffer 151 and second buffer 152 may be included on the side of the preceding system. In this case, at least one of the first buffer 231 and second buffer 232 of the laser control unit 200 also may be included on the side of the preceding system.

In addition, in the case of the two systems of the control device 30 are configured by one numerical control device and servo control device, and in the case of the coordinates (XYZ coordinates, machine coordinates) for every predetermined period of the focal point (or center) of the laser beam, or the movement amount (interpolation data) for every predetermined period of the focal point (or center) of the laser beam obtained from the first system by the second system not being delayed much compared to that of the first system, the first buffer 151 and second buffer 152 may not be included. In this case, the first buffer 231 and second buffer 232 of the laser control unit 200 also may not be included.

Second Embodiment

With the aforementioned first embodiment, the control device 30 performs synchronous control of the scanners 21, 22 of two systems, so that the laser beams of two systems irradiate on the same location of the powder bed (machining target) and scan the same path. With the second embodiment, the control device 30 performs tracking control of the scanners 21, 22 of two systems so as to cause the focal points (or centers) of the laser beams outputted from the scanners 21, 22 of two systems to differ, the laser beam outputted from the scanner 21 of the first system irradiates the powder bed (machining target) prior to the laser beam outputted from the scanner 22 of the second system, the focal point (or center) of the laser beam outputted from the scanner 22 of the second system follows the focal point (or center) of the laser beam outputted from the scanner 21 of the first system on the same path.

The configuration of the laser machining apparatus according to the second embodiment, is identical to the configuration of the laser machining apparatus 1 of the first embodiment shown in FIG. 1. In addition, the configuration of the control device of the laser machining apparatus according to the second embodiment is identical to the configuration of the control device 30 of the laser machining apparatus of the first embodiment shown in FIG. 3 or FIG. 4. It should be noted that, with the control device of the laser machining apparatus according to the second embodiment, the functions and operations of the scanner control unit 100 and laser control unit 200 differ from the functions and operations of the scanner control unit 100 and laser control unit 200 of the control device 30 of the laser machining apparatus of the first embodiment.

The second buffer 152 of the scanner control unit 100 has a function of temporarily saving and delaying the control command of the second scanner 22 which delays operation. In addition, the second buffer 232 of the laser control unit 200 has a function of temporarily saving and delaying the control command of the second laser 12 which delays the laser output.

The scanner control unit 100 thereby performs tracking control to delay operation of the second scanner 22 relative to operation of the first scanner 21, i.e. to cause the operation of the first scanner 21 to precede the operation of the second scanner 22. At this time, the laser control unit 200 performs tracking control to delay the laser output of the second laser 21 corresponding to the second scanner 22 relative to the laser output of the first laser 11 corresponding to the first scanner 21, i.e. to cause the laser output of the first laser 11 to precede the laser output of the second laser 12.

Figure 5B:
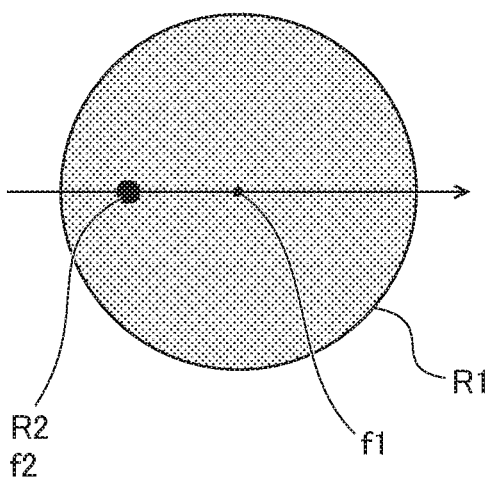
FIG. 5B is a view showing an example of the relationship of a plurality of laser beams according to a laser machining apparatus according to a second embodiment.

More specifically, as shown in FIG. 5B, the scanner control unit 100 controls the angles of the mirrors 25, 26 (i.e. rotational position of the servomotors 25a, 26a) and the position of the converging lens 27 (i.e. rotational position of the servomotor for the lens) in each of the first scanner 21 and second scanner 22, so that the laser beam emitted from the first scanner 21 of the first system irradiates the powder bed prior to the laser beam emitted from the second scanner 22 of the second system; and the focal point (or center) f2 of the laser beam emitted from the second scanner 22 of the second system follows the focal point (or center) f1 of the laser beam emitted from the first scanner 21 of the first system on the same path (on the arrows). The scanner control unit 100 thereby performs tracking control of the scanners 21, 22 of two systems.

In addition, the scanner control unit 100 controls the position of the converging lens 27 of the first scanner 21 so that the focal point f1 of the laser beam emitted from the first scanner 21 of the first system shift from the powder bed. The scanner control unit 100 can thereby make the radiation range (beam diameter) R1 on the powder bed of the laser beam emitted from the first scanner 21 of the first system larger than the radiation range (beam diameter) R2 on the powder bed of the laser beam emitted from the second scanner 22 of the second system.

At this time, the laser control unit 200 may make the machining condition of the first laser 11 of the first system and the machining condition of the second laser 12 of the second system differ. More specifically, the scanner control unit 100 sets the machining condition of the first laser 11, so that the laser output of the first laser 11 corresponding to the first scanner 21 having a larger radiation range (beam diameter) becomes smaller than the laser output of the second laser 12.

As explained above, according to the control device 30 of the second embodiment, in the synchronous control of the laser machining apparatus 1, it is possible to perform tracking control which causes the focal point (or center) of the laser beam emitted from the scanners 21, 22 of the two systems to differ, in which the laser beam outputted from the scanner 21 of the first system irradiates the powder bed prior to the laser beam emitted from the scanner 22 of the second system, and the focal point (or center) of the laser beam emitted from the scanner 22 of the second system follows the focal point (or center) of the laser beam emitted from the scanner 21 of the first system on the same path.

In addition, according to the control device 30 of the laser machining apparatus of the second embodiment, by making the radiation range (beam diameter) on the powder bed of the laser beam emitted from the preceding first scanner 21 of the first system larger, preheating by the laser beam from the first scanner 21 is performed for a longer time, and melting by the laser beam from the second scanner 22 which is following becomes a short time (refer to FIG. 5B). Furthermore, after melting by the laser beam from the second scanner 22 which is following, irradiation of the laser beam from the first scanner ends quickly, the melting location cools rapidly (heat dissipation), and solidifies fast (refer to FIG. 5B).

It should be noted that, in the example of FIG. 5B, the laser beam from the second scanner 22 overlaps the laser beam from the first scanner 21; however, the laser beam from the second scanner 22 may alienate from the laser beam from the first scanner 21.

Although embodiments of the present invention have been explained above, the present invention is not to be limited to the aforementioned embodiments, and various changes and modifications thereof are possible. For example, the aforementioned embodiments exemplify galvanoscanners as the first scanner 21 and second scanner 22; however, the first scanner and second scanner are not limited thereto, and may be various scanners such as trepanning scanners.

In addition, the aforementioned embodiments exemplify the laser machining apparatus 1 which includes the two lasers 11, 12 and the two scanners 21, 22; however, the present invention is not to be limited thereto. The characteristic of the aforementioned embodiments is being applicable to a laser machining apparatus which includes a plurality of lasers and a plurality of scanners which respectively scan laser beams emitted from the plurality of lasers. In this case, in the control device of the laser machining apparatus of the aforementioned embodiments, the scanner control unit may further include a plurality of systems similar to the second system including the second kinematics conversion unit, second buffer, second coordinate conversion unit and second servo control unit (refer to FIG. 3) (further second focal-point coordinate update unit in FIG. 4), and the laser control unit may further include a plurality of systems similar to the second system including the second machining condition reading unit 222, second buffer and second laser control unit.

In addition, the aforementioned embodiments exemplify the laser machining apparatus which performs the additive manufacturing of the powder bed fusion method; however, the present invention is not to be limited thereto. For example, the characteristic of the aforementioned embodiments is being applicable to a device which performs various laser machining including a plurality of lasers, and a plurality of scanners which respectively scan the laser beams emitted from the plurality of lasers.

EXPLANATION OF REFERENCE NUMERALS 1 laser machining apparatus
11 first laser
12 second laser
21 first scanner
22 second scanner
25, 26 mirror
25a, 26a servomotor
27 converging lens
30 control device
100 scanner control unit
110 machining program analysis unit
120 interpolation unit
130 focal-point coordinate update unit
131 first focal-point coordinate update unit
132 second focal-point coordinate update unit
141 first kinematics conversion unit
142 second kinematics conversion unit
151 first buffer
152 second buffer
161 first coordinate update unit
162 second coordinate update unit
171 first servo control unit
172 second servo control unit
200 laser control unit
210 machining program analysis unit
221 first machining condition reading unit
222 second machining condition reading unit
231 first buffer
232 second buffer
241 first laser control unit
242 second laser control unit
250 storage unit
251 first machining condition
252 second machining condition

What is claimed is:

1. A control device for a laser machining apparatus including a plurality of lasers, and a plurality of scanners which respectively scan laser beams outputted from the plurality of lasers, the control device comprising:
 a scanner control unit which synchronously controls the plurality of scanners; and
 a laser control unit which synchronously controls the plurality of lasers,
 wherein the scanner control unit performs tracking control to precede or delay operation of at least one scanner among the plurality of scanners relative to operation of another scanner among the plurality of scanners, and wherein the laser control unit performs tracking control to precede or delay laser output of at least one laser among the plurality of lasers corresponding to the at least one scanner, relative to laser output of another laser among the plurality of lasers corresponding to the other scanner.

2. The control device for a laser machining apparatus according to claim 1, wherein the scanner control unit includes a buffer which temporarily saves a control command of the scanner to delay operation among the plurality of scanners, and
wherein the laser control unit includes a buffer which temporarily saves a control command of the laser to delay laser output among the plurality of lasers.

3. The control device for a laser machining apparatus according to claim 1, wherein the scanner control unit controls the plurality of scanners so that:
a laser beam outputted from the at least one scanner irradiates a machining target prior to a laser beam outputted from the other scanner, and
a focal point or center of the laser beam outputted from the other scanner follows a focal point or center of the laser beam outputted from the at least one scanner on the same path.

4. The control device for a laser machining apparatus according to claim 3, wherein the scanner control unit controls the plurality of scanners so that a beam diameter on the machining target of the laser beam outputted from the at least one scanner becomes larger than a beam diameter on the machining target of the laser beam outputted from the other scanner.

5. A laser machining apparatus, comprising:
a plurality of lasers;
a plurality of scanner which respectively scan laser beams outputted from the plurality of lasers; and
a control device for the laser machining apparatus according to claim 1 which controls the plurality of scanners.

* * * * *